2,728,762

AZO-DYESTUFFS OF THE PYRAZOLONE AND PYRAZOLE SERIES

Johannes Heyna and Otto Hensel, Frankfurt am Main Hochst-Unterliederbach, and Werner Schnorrenberg, Hofheim (Taunus), Germany, assignors to Farbwerke Hoechst Aktiengesellschaft vormals Meister Lucius und Brüning, Frankfurt am Main Hochst, Germany, a company of Germany No Drawing. Application February 16, 1953,
Serial No. 337,216

Claims priority, application Germany February 19, 1952

1 Claim. (Cl. 260—163)

The present invention relates to new azo-dyestuffs of the pyrazolone and pyrazole series and to a process of preparing them; more particularly it relates to dyestuffs corresponding to the following general formula

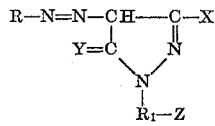

wherein R and $R_1$ represent aryl radicals, X represents a methyl or carbalkoxy group, Y stands for O or NH and Z stands for one of the groups —$SO_2$—CH=$CH_2$ or —$SO_2$—$CH_2$—$CH_2$—$OSO_3H$ We have found that valuable azo-dyestuffs of the pyrazolone and pyrazole series can be obtained by coupling with any diazo-compound a 1-arylpyrazolone or a 1-arylpyrazole which contains in the aryl radical one of the following groups

—$SO_2$—CH=$CH_2$ or

—$SO_2$—$CH_2$—$CH_2$—$OSO_3H$

The new dyestuffs so obtained yield, especially from a neutral or weakly alkaline bath, on various fibrous materials, such as wool, polyamide fibers, cotton, viscose rayon, acetate rayon and the like, dyeings which are distinguished by a very good fastness to wet processing and in many cases by a good to very good fasteness to light. Those dyestuffs which contain in the molecule groups capable of forming metal complex compounds are especially suitable for the single-bath chrome process.

The arylpyrazolones or arylpyrazoles used for the manufacture of the dyestuffs of this invention can be obtained in known manner, for example, from the corresponding amines containing a β-hydroxyethyl sulfone group by causing the corresponding hydrazines to react with acetoacetic ester or diketene or diacetonitrile.

The β-hydroxyethylsulfonyl-aryl pyrazolones or the β-hydroxyethylsulfonyl-aryl pyrazoles can be transformed into the corresponding compounds containing the group —$SO_2$—CM=$CH_2$ or the group

—$SO_2$—$CH_2$—$CH_2$—$OSO_3H$ for instance, according to the processes disclosed in French Patents Nos. 901,306, 901,167 or 901,199.

The following examples serve to illustrate the invention but they are not intended to limit it thereto, the parts being by weight:

Example 1

137 parts of 1-aminobenzene-2-carboxylic acid are diazotized in the usual manner and coupled with 282 parts of 1-(4'-β-hydroxyethylsulfonyl-phenyl)-3-methyl-5-pyrazolone in the presence of an excess of sodium carbonate solution. The dyestuff formed is completely precipitated with sodium chloride and filtered off with suction. The dried dyestuff is then introduced at 20° C. into 2700 parts of sulfuric acid of 96 per cent strength and after dissolution it is precipitated by pouring the solution on ice. It is filtered off with suction and washed with sodium chloride solution until neutral. The dyestuff corresponds to the following formula:

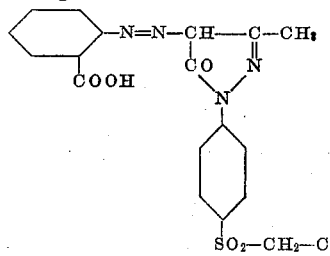

It is a yellow powder which is easily soluble in warm water and dyes wool and polyamide fibers from a neutral bath or a bath containing ammonium sulfate and sodium sulfate greenish yellow tints of high tinctorial strength. With particular advantage the dyestuff can also be dyed by the metachrome process and yields a yellow tint of very good fastness properties.

Example 2

128 parts of 1-amino-2-chlorobenzene are diazotized in the usual manner and coupled with 312 parts of 1-(2'-methoxy - 5' - β - hydroxyethylsulfonyl-phenyl)-3-methyl-5-pyrazolone in the presence of an excess of sodium-carbonate solution. The dyestuff is worked up as described in Example 1 and converted into the sulfuric acid ester. It dyes wool clear, yellow tints of very good fastness properties.

Example 3

93 parts of aniline are diazotized in the usual manner and coupled with 316 parts of 1-(2'-chloro-5'-β-hydroxyethylsulfonyl-phenyl)-3-methyl-5-pyrazolone in the presence of an excess of sodium carbonate solution. The dyestuff formed is worked up as described in Example 1. It dyes wool greenish yellow tints of very good fastness properties.

Example 4

93 parts of aniline are diazotized as usual and coupled with 340 parts of 1-(4'-β-hydroxyethylsulfonylphenyl)-3-carbethoxy-5-pyrazolone in the presence of an excess of sodium carbonate solution. The dyestuff formed is worked up as described in Example 1. It dyes wool clear, yellow tints of very good fastness properties.

Example 5

300 parts of 1-amino-2-hydroxy-3.5-dinitrobenzene (of 67 per cent. strength) are diazotized in the usual manner and the diazo solution is combined with 282 parts of 1 - (4' - β - hydroxyethylsulfonyl-phenyl)-3-methyl-5-pyrazolone in the presence of an excess of sodium carbonate solution. The dyestuff formed is worked up as described in Example 1. By the metachrome process it is well absorbed by wool and yields orange red tints of very good fastness properties.

Example 6

173 parts of 1-aminobenzene-2-sulfonic acid are diazotized in the usual manner and the diazo solution is coupled with 282 parts of 1-(4'-β-hydroxyethylsulfonyl-phenyl)-3-methyl-5-pyrazolone in the presence of an excess of sodium carbonate solution. The dyestuff formed is converted into the sulfuric acid ester as described in Example 1 and the solution of the ester is rendered weakly alkaline to phenolphthalein-paper with caustic soda solution in the cold. After acidification, the dyestuff formed is filtered off with suction. It dyes wool greenish yellow tints of very good fastness properties. The dyestuff corresponds to the following formula:

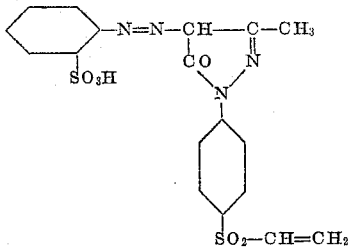

*Example 7*

137 parts of 1-aminobenzene-2-carboxylic acid are diazotized as usual and the diazo compound is coupled with 281 parts of 1-(4'-β-hydroxyethylsulfonyl-phenyl)-3 methyl-5-aminopyrazole in an acetic acid solution. The precipitated dyestuff is dried and worked up as described in Example 1. It dyes wool greenish yellow tints of very good fastness properties. The dyestuff corresponds to the following formula

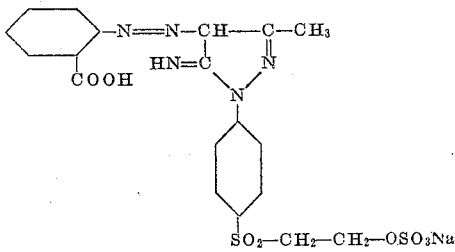

*Example 8*

282 parts of 1-(4'-β-hydroxyethylsulfonyl-phenyl)-3-methyl-5-pyrazolone are dissolved at 20° C. in 750 parts of sulfuric acid of 94 per cent. strength, the solution is poured on 10,000 parts of ice water and neutralized with sodium acetate to pH 4. The solution so obtained is mixed with the diazo-solution from 137 parts of 1-aminobenzene-2-carboxylic acid. The dyestuff formed is filtered off with suction and washed with a solution of sodium chloride until neutral. It is identical with the dyestuff obtained as described in Example 1.

*Example 9*

264 parts of 1-(4'-vinylsulfonylphenyl)-3-methyl-5-pyrazolone, obtainable by treating the sulfuric acid ester of 1-(4'-β-hydroxyethylsulfonyl-phenyl)-3-methyl-5-pyrazolone with an alkali by the process described in French Patent No. 901,167, are dissolved in the cold in 5000 parts of water and 40 parts of sodium hydroxide. The solution is mixed with 106 parts of sodium carbonate and coupled at 0° C.–5° C. with a diazo-solution of 173 parts of 1-aminobenzene-2-sulfonic acid. The dyestuff formed is identical with that obtained as described in Example 6.

*Example 10*

10 parts of the diazonium salt from the sulfuric acid ester of 1-methoxy-2-aminobenzene-4-(β-hydroxyethylsulfone) (of 95.5 per cent. strength) are coupled with 12 parts of the potassium salt of the sulfuric acid ester of 1 - (4' - β - hydroxyethylsulfonyl-phenyl)-3-methyl-5-pyrazolone in methanol in the presence of anhydrous potassium acetate. When the coupling is complete, the dyestuff is filtered off with suction and dried. It dyes wool and polyamide fibers clear yellow tints of very good fastness to wet processing and to light.

In the following table are given further components which can be used according to the present invention and the tints of the azo-dyestuffs so obtained, which likewise possess good fastness properties:

| Diazo Component | Coupling Component | Tint |
|---|---|---|
| (1) 1-aminobenzene-2-sulfonic acid. | 1-(2'-chloro-6'-methyl-4'-vinylsulfonyl-phenyl)-3-methyl-5-pyrazolone. | yellow. |
| (2) 1-amino-4-chlorobenzene-6-sulfonic acid. | 1-(2'-methoxy-5'-vinylsulfonyl-phenyl)-3-methyl-5-pyrazolone. | Do. |
| (3) 1-aminobenzene-4-sulfonic acid. | 1-(3'-vinylsulfonyl-phenyl)-3-methyl-5-pyrazolone. | Do. |
| (4) 1-amino-4-chloro-6-trifluoro-methylbenzene. | sulfuric acid ester from 1-(2'-methyl-4'-β-hydroxyethylsulfonyl-phenyl)-3-methyl-5-pyrazolone. | Do. |
| (5) 4.4'-diamino-triphenylmethane. | sulfuric acid ester from 1-(2'.5'-dichloro-4'-β-hydroxyethylsulfonyl-phenyl)-3 methyl-5-pyrazolone. | Do. |

We claim:
The azo-dyestuff corresponding to the following formula

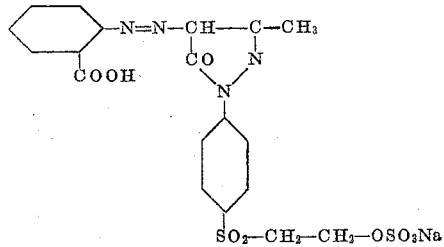

References Cited in the file of this patent
UNITED STATES PATENTS

| 1,149,231 | Wagner et al. | Aug. 10, 1915 |
| 2,424,493 | Muller et al. | July 22, 1947 |
| 2,657,205 | Heyna et al. | Oct. 27, 1953 |